May 14, 1963  F. FRÜNGEL  3,089,947
ARRANGEMENT AND METHOD FOR ELECTRICAL IMPULSE WELDING
Filed Dec. 20, 1960  2 Sheets-Sheet 1

INVENTOR.
Frank Früngel
BY
Michael S. Striker
Attorney

United States Patent Office 3,089,947
Patented May 14, 1963

3,089,947
ARRANGEMENT AND METHOD FOR ELECTRICAL IMPULSE WELDING
Frank Früngel, Suelldorfer Landstrasse 400, Hamburg-Rissen, Germany
Filed Dec. 20, 1960, Ser. No. 77,229
8 Claims. (Cl. 219—107)

The present invention concerns a method and apparatus for resistance-welding, and more particularly for welding a weldable element from one side to one face of a weldable body having at least two faces opposite to each other. The apparatus and method according to the invention is of a particular significance for welding elements to one side of sheet metal bodies where the opposite side is not accessible and where the opposite side is sensitive to damage caused by heat derived from the welding operation on the first mentioned side, particularly if the above-mentioned opposite side is coated with insulating or other material having a low melting point.

Resistance-welding operations under the above-mentioned conditions call for very specific apparatus and method steps based on very involved consideration of the various critical factors, the degree of proper consideration whereof will tip the scales between success or failure of the operation.

Although many methods and devices for electric resistance welding are known, it is a main object of this invention to solve the critical problem of producing a satisfactory welded connection between a weldable element and one face of a weldable body, particularly of comparatively thin sheet metal having on the face opposite to the welding face a surface or layer which would be damaged by heat exceeding a predetermined critical value.

It is a further object of the invention to provide an apparatus capable of carrying out a welding operation of the type set forth, with sufficient energy concentrated in the actual weld area while leaving the remaining portions and surfaces of the body to which an element is to be welded, unharmed by heat.

It is still another object of the invention to provide for a method giving satisfactory results in an operation for the purpose set forth.

With above objects in view, a resistance welding machine for welding a weldable element from one side to the face of a weldable body, utilizing an electric impulse source for producing a welding current impulse of extremely brief duration, according to the invention, comprises, in combination, an electrode arrangement comprising inner electrode means and hollow outer electrode means surrounding said inner electrode means, said electrode means being telescopingly movable relative to each other, said outer electrode means having at its front end a contact face of predetermined area adapted to engage one face of a weldable body, said inner electrode means being adapted to hold a weldable member conductively connected thereto and in position for being welded to said weldable body in a weld area being a predetermined small fraction of said contact face area; moving means for pressing said contact face of said outer electrode means against said one face of said weldable body and for pressing said weldable element held by said inner electrode means against the same face of said weldable body within the area thereof surrounded by said contact face of said outer electrode means, whereby the heating effect of the welding current impulse is restricted to that portion of the weldable body which is immediately adjacent to said one face thereof, without extending to the opposite face thereof; and conductor means connected to said inner and outer electrode means, respectively, said conductor and electrode means being dimensioned and arranged in such a manner that the total inductance thereof is kept below .1 μh.

Moreover, a method of resistance welding a weldable element from one side to one face of a weldable body having at least two faces opposite to each other, comprises according to the invention, the steps of: establishing physical contact between the weldable element and the body in a predetermined area of one face of the latter; establishing an electrical circuit through one electrode in contact with said weldable element, through said body and through a second electrode in contact with said one face of said body in an area considerably larger than said predetermined area; and injecting into said circuit electric energy in a sufficient amount to raise the temperature in said predetermined area within a predetermined period of time to welding temperature characteristic of the materials of said weldable element and body, the duration of said period of time and the wattage of said electric energy being limited to such degree that the heat carried by said body from the weld area by thermal convection characteristic of the material of said body is insufficient to raise the temperature at the opposite face of said body beyond a point causing damage to said opposite face, whereby a welding element can be welded to one face of even a comparatively thin sheet metal body without damaging the structure and appearance of the opposite face thereof.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
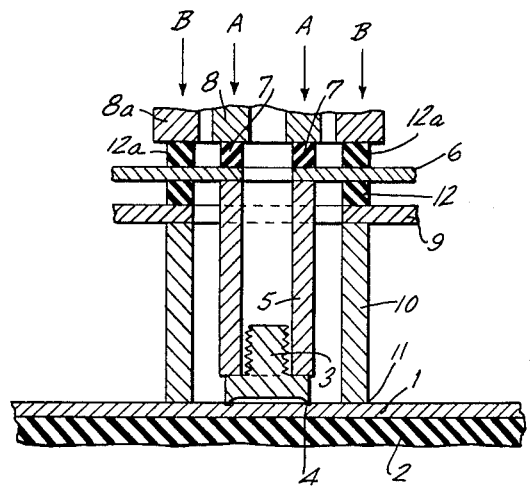
FIG. 1 is a diagrammatic sectional elevation of one form of an embodiment of the apparatus according to the invention.

FIG. 1 illustrates the method and apparatus according to the invention for welding a bolt 3 to one face of a comparatively thin sheet of metal 1 covered along its opposite face with a layer 2 of insulating or lacquer material e.g. of synthetic nature and having a comparatively low melting point. The head of the bolt 3 is hollow so as to have a projecting rim 4 along which the actual welding operation is to be carried out. Since the welding operation is to be carried out from one side of the sheet metal 1, two electrodes are provided. The inner electrode 5 is, in this example, of cylindrical form as shown having at its front end a recess, or a bore all the way through, for accommodating the shank of the bolt 3. The rearward end of the electrode 3 is connected to a source of energy by means of a strip-type conductor 6 attached thereto so that the conductor 6 also supports the electrode 3 in proper position within the tubular outer electrode 10. This electrode 10 engages in welding position the first face of the sheet metal 1 in a contact area 11. A second, strip-type conductor 9 is attached to the rearward end of the outer electrode 10 for connecting the latter also to the above-mentioned source of electric energy. Both electrodes 5 and 10 may be held and placed in proper position by mechanical means, not shown, cooperating with the strips 6 and 9, respectively. An elastic, insulating pad or ring 12 is provided between the strip conductors 6 and 9.

and similar pads or rings of elastic, preferably insulating material 7 and 12a, respectively, are arranged on top of the strip conductor 6 for transmitting to the electrodes 5 and 10 pressure applied in the direction of the arrows A and B by pressure heads 8 and 8a, respectively, either jointly or separately.

The strip conductors 6 and 9 are connected with the output terminals of an impulse welding transformer, not shown in the drawing.

The pressure A is transmitted from the head 8 through the elastic ring 7, the combination of strip 6 and electrode 5 to the head of the bolt 3. The pressure B is similarly transmitted from the head 8a through the elastic ring 12a, strip conductor 6, elastic ring 12 to the combination of strip conductor 9 and outer electrode 10. The mechanical means for applying said pressure are well-known and therefore not shown in the drawing. In certain cases the heads 8 and 8a may be rigidly connected with each other, or, as shown in FIG. 1, may be capable of being actuated separately and independently from each other in which case at least the ends of the heads 8 and 8a are formed as concentric tubular members.

For carrying out satisfactorily the method according to the invention it is of great importance that the area of the contact surface 11 is considerably larger than the contact area along the ridge 4 so that the concentration of current is sufficient in the welding area 4 while the concentration of current in the contact area 11 is so low that no welding phenomena develop between the electrode 10 and the sheet metal 1.

Figure 2:
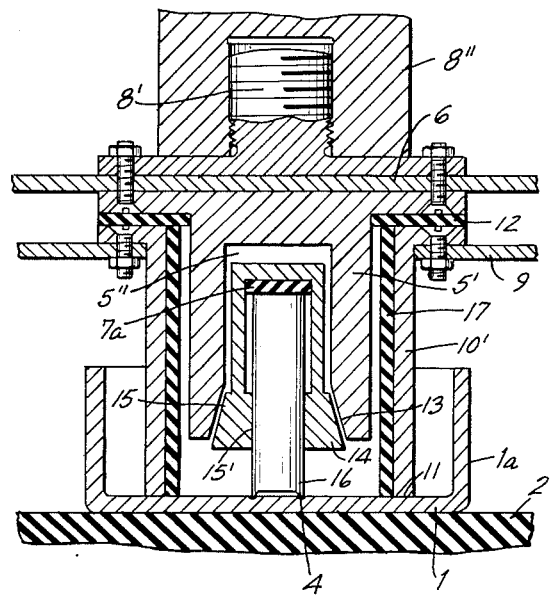
FIG. 2 is a similar sectional elevation of a modified form of the apparatus according to the invention.

While FIG. 1 illustrates a comparatively simple form of an arrangement according to the invention, FIG. 2 illustrates a modified and more developed embodiment thereof. The arrangement according to FIG. 2 is particularly well suited for welding finish-machined parts, e.g. a shaft or pivot pin 16 to a sheet metal body 1, particularly to the bottom of a cup-shaped member having a wall 1a. The example illustrated by FIG. 2 concerns the welding of a precisely ground cylindrical stud 16 along its projecting welding rim 4 to the bottom of the member 1 which may be coated on the outer side with heat sensitive material 2 or already connected therewith. In this embodiment the inner electrode is a composite structure comprising a body 5' having a central recess 5" ending with a conical bevel portion 13, and an inner clamping member or chuck 14 which is located in the recess 5" and has a correspondingly beveled outer end 15 cooperating with the bevel 13 in well-known manner. The member 14 is axially split (the split not being shown in the drawing), and has an inner cylindrical face for accommodating and clamping the stud 16 when the chuck is compressed by a forward movement of the body 5' relatively to the chuck member 14. The above-mentioned inner cavity of the member 14 is closed at the rear end and fitted with an elastic pad 7a which bears against the rear end of the stud 16 whereby the clamping action of the member 14 in the above-described manner is made possible. It is recommended to have the inter-engaging bevel surfaces 13 and 15 hard chrome plated, heavily silver plated and/or polished.

If a highly polished member as for instance the pivot stud 16 is to be welded to the member 1 then it is advisable to prevent the appearance of burns on the outer surface of the member 16 by having the inner clamping surface 15' of the member 14 also highly polished.

As can be seen from FIG. 2, the pressure head 8" is fitted with a flanged holder 8' to which is attached the inner electrode body 5' by screws with the strip conductor 6 interposed therebetween. Similarly the upper end of the outer electrode 10' is provided with a flange to which the second strip conductor 9 is attached by screws. The elastic ring 12 is interposed between the flange of the electrode body 5' and the flange of the electrode 10'. An additional tubular insulating member 17 is arranged, for safety's sake, as a lining of the outer electrode 10'.

In operation, when the whole arrangement is positioned as shown by FIG. 2, and pressure is exerted by the pressure head combination 8', 8", the forward movement of the inner electrode body 5' will first cause engagement between the conical surfaces 13 and 15 so as to firmly clamp the member 16 in the chuck member 14 whereafter the member 16 is firmly pressed with its projecting rim 4 into engagement with the sheet metal member 1. By further or simultaneous compression of the elastic pad or ring 12 the pressure is also exerted on the outer electrode 10' so that the latter is forced into pressure engagement with the sheet metal member 1 along the contact area 11. Now the welding operation can be carried out by the application of an impulse to the electrodes.

It is to be stressed that by using an arrangement as described above it is possible to reduce stray flux to a minimum. In fact, it is even possible that the stray flux is reduced to zero because the strip-type conductors 6 and 9 do not produce an external stray field, and the same applies to the two coaxial electrodes 5, 10 or 5', 5", 10", respectively. Therefore, the method and arrangement according to the invention is particularly well suited for those cases in which members are to be welded to a thin piece of sheet metal from one side, while the opposite side is provided with insulating and heat-sensitive material, or is in itself of highly heat-sensitive nature e.g. by being polished, yet without causing any damage to the heat-sensitive material or surface on the opposite face of the sheet material. The values of the permissible maximum temperature will vary depending upon the nature of the outer surface or of the coating of the outer surface of the sheet metal. The variability of the permissible maximum temperatures may be taken into consideration by shaping the electrodes in a corresponding suitable manner, while maintaining their coaxial relation, whereby the magnitude of the stray flux can be varied. For instance, the permissible temperature may be higher if the respective sheet metal consists of aluminum, and when in the process of welding of members to one side of a member of sheet aluminum a superficial eloxal layer or other surface finish of the aluminum is to be prevented from being damaged by heat. In such a case it is advisable to use electrode members which are not substantially cylindrical but e.g. of rectangular or square cross-section but otherwise telescoping in the same manner as described above. As an auxiliary measure, it is also possible to apply a cooling effect to the coated or finished remote face of the sheet metal, e.g. by arranging a thick copper plate in contact therewith, or by arranging in contact therewith a water-cooled rubber bag which is pressed hydraulically against the sheet metal. On the other hand, the welding current impulses can be made so short and the electrical energy introduced thereby can be kept so small that only an extremely thin surface layer of e.g. .1 mm. depth is involved in the actual welding operation so that the heat developed at the welding spot is not sufficient for unduly raising the temperature at the other side of the sheet metal.

If the members to be welded are of comparatively large size, then even in the case of impulse welding the current requires a certain length of time for increasing to its maximum value which period of time may amount, for a maximum current of 100,000 amperes e.g. to a value of the order of 10 ms. because the inevitable inductances of transformers must be overcome and because therefore a current increase of unlimited steepness is impossible. In such cases it is advisable to start the welding operation i.e. the flow of current already when a first small fraction of the pressure applied to the weldable members is being exerted so that thereafter the current will increase simultaneously with the increase of pressure. In this manner the effect is obtained that with simultaneously increasing pressure and current an optimal pressure exists during all phases of the operation in relation to the varying values of current. On the other hand, if the flow of current would be started only after the full pressure has been applied, this would result in an extremely small contact resistance between the weldable members so that under certain conditions on account of this small resistance hardly any resistance heat is created sufficient for producing a weld so that no satisfactory welding or no welding at all would result. This is the reason why it is advisable to start the welding current already at the moment when the weldable members are only in loose contact with each other in order to start the development of a softened or liquefied phase of the respective metals. During the further course of the welding operation the softened or liquefied phase increases with increasing current while at the same time the applied pressure increases so that the maxima of both the pressure and of the current practically coincide.

The method and apparatus according to the invention can be used with advantage, in addition to the cases described above, for carrying out welding operations by which comparatively flat or sheet-like members are to be provided or connected by welding with any kinds of attachments or elements on one face thereof while the other face of the particular flat or sheet-like member is not accessible. Among other possibilities, a particular field of application of the invention is that of attaching holding brackets to aluminum plates which are nowadays being used in increasing numbers as an outer covering of building walls for the purpose of serving as thermal insulation.

It can be seen from the above that the invention serves to greatly expand the field of applicability of impulse welding.

Further advantageous modifications of the apparatus according to the invention and particularly advantageous details of the method to be applied will be described now with reference to FIGS. 3 and 4.

In order to achieve the above listed objects of the invention and other advantages it is of great importance to choose, based on corresponding calculation of the respective factors, the amount of electrical welding energy injected into the welding arrangement for a duration of the order of milliseconds, in such a manner that for instance, if the welding operation is applied to a distinct point, the heat generated at this point and expanding therefrom radially in all directions is sufficient to raise the temperature along the circumference of a semi-spherical portion of the sheet material around said point to the maximum permissible temperature, the radius of said semi-spherical portion being just about equal to, or just slightly less than, the thickness of the sheet material. For producing the heating effect the electrical energy of the impulse having a predetermined duration may be produced by a directly applied, or transformed, condenser discharge having preferably an aperiodic characteristic or in connection with inductive storage. However, the energy impulse can also be produced by deriving it, by any known circuit means, from a low-frequency alternating current or by deriving it from a storage battery.

Figure 3:
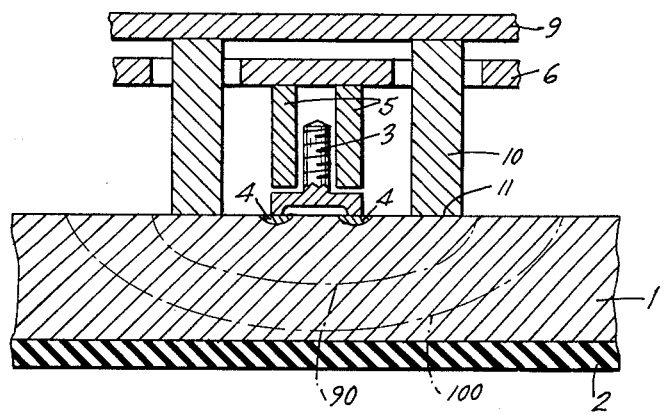
FIG. 3 is a similar diagrammatic sectional view of a welding arrangement illustrating the method and an apparatus according to the invention.

Referring now to FIG. 3, which is generally similar to FIGS. 1 and 2, an arrangement is shown in which a bolt 3 with a hollow head is to be attached by so-called coaxial welding to one face of a comparatively thin piece of sheet metal 1 which is provided with a lacquer or insulating layer 2 along its other face. In this arrangement for carrying out a coaxial welding operation the cylindrical, pressure-applying electrode 5 serves to press the bolt 3 against the sheet metal 1, the electrode 4 being connected with a strip-type conductor 6. The second or outer electrode 10 which is also of cylindrical shape is arranged so as to surround the inner electrode 5. The outer electrode 10 is connected with a second strip-type conductor 9 and is positioned so as to be in conductive contact with the surface of the sheet metal 1. Since it is not intended to permit a welding action to occur between the outer electrode 10 and the sheet metal 1 the cross-sectional area of the electrode 10 is chosen to be comparatively large. The strip conductors 6 and 9 which may, if desired, consist of flexible, preferably low-inductance flat-braided strands, are connected in generally known manner with a welding transformer arrangement 111, 112 (see FIG. 4) or with some other source for welding energy.

It is now a feature of the method according to the invention that the dimension of the actual welding area 4 (in the present case of annular configuration) is predetermined, by suitable determination of the time factors involved and by suitable limitation of the energy applied for electrically heating the material, in relation to the existing thickness of the sheet material to be so small that, on the basis of careful calculation beforehand, the boundary between the sheet metal 1 and its coating or covering 2, after completion of the welding operation and the ensuing travel of the primary heat by conduction through the sheet metal, is heated not more than to the maximum permissible temperature compatible with the material of the coating or layer 2. The factors involved in this consideration are diagrammatically illustrated in FIG. 3 in the form of isothermal curves 90 and 100 in FIG. 3. The isothermal line 100 would in this case represent the maximum permissible temperature for the coated opposite face of the sheet material.

By way of example, the required calculation for predetermining the above-mentioned factors follows herebelow in a simplified form which applies to a single point-like welding spot. The isotherm has ultimately, i.e. when it reaches the lower boundary, hemispheric form. The electric energy required for producing this particular isotherm is in this case determined by the equation:

$$E = \Delta T \cdot \tfrac{2}{3} r^3 \cdot \pi \cdot \gamma \cdot c$$

wherein $T=$ permissible temperature increase at the boundary 1, 2;
$\tfrac{2}{3} r^3 \pi =$ volume of the hemisphere having a radius $r$ equal to the thickness of the sheet metal 1;
$\gamma =$ density of the sheet material;
$c =$ specific heat of the sheet material.

From this results a calculation, e.g. for sheet steel of $r=1$ mm., $\gamma=8$ mg./mm.$^3$, and $c=.1$ cal./g. ° C., and under the assumption of a maximum permissible temperature rise of 100° C., which is usually permissible for lacquer or insulating layers 2, a proper amount of electrical energy to be injected as follows:

$$E = \tfrac{2}{3} \cdot 1 \cdot \pi \cdot 8 \cdot 0.1 \cdot 10^{-3} \cdot 100 = 0.16 \text{ cal.}$$

and under the assumtption of 1 ws.$=0.239$ cal. the energy amount to be applied is $$E = 0.63 \text{ watt seconds}$$

It is fair to assume that about an equal amount of energy is dissipated by heat conduction in the material of the bolt 3 so that the total amount of energy to be applied is equal to twice the above calculated amount, namely $E'=1.26$ watt seconds. This extremely small amount of electrical energy is therefore the amount to be provided for, and in spite of its small magnitude this amount of energy would still suffice to create melting temperature in a smaller hemispherical volume amounting to about $\tfrac{1}{20}$ of the volume enclosed by the isotherm 100, or in the particular example having a radius of about .25 mm. Hereby a reliable weld is assured in the respective small welding area.

However, since energy losses are unavoidable in the entire circuit arrangement, such losses must be determined for being taken into consideration in the calculation so as to carry out the method properly. The sum of the above calculated welding energy in addition to the just mentioned losses would then determine the total electric energy which is to be injected into the welding arrangement.

Figure 4:
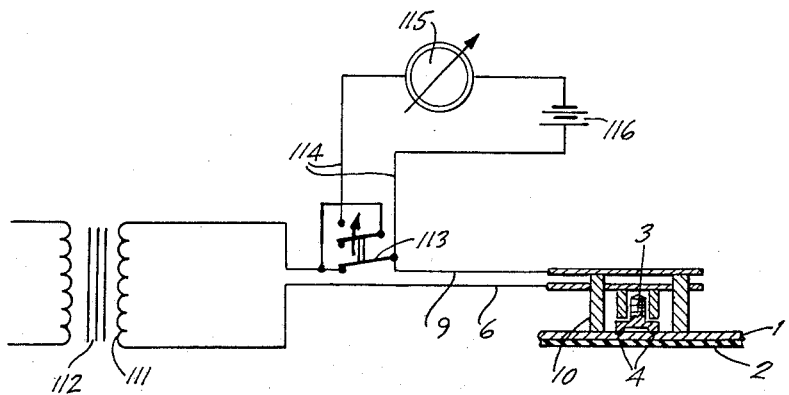
FIG. 4 illustrates diagrammatically an arrangement according to the invention in which also loss factors affecting the method can be predetermined.

FIG. 4 shows in what manner the energy losses can be determined. In the arrangement illustrated by FIG. 4 those elements or members thereof which are illustrated in FIG. 3 are designated by the same reference numerals. However the strip conductors 6 and 9 are connected in this case with the terminals of a secondary winding of a second transformer, e.g. an impulse transformer, the iron core 112 whereof is only shown diagrammatically. If now the strip conductor 9 is interrupted at the point 113 and if a direct current from a source 116 is passed through the whole arrangement, then it is possible, by probing the existing potentials and using a reflecting galvanometer 115 or some equivalent instrument, to determine which is the total resistance in the welding current circuit and, moreover, how much of resistance is contributed to the total resistance by the particular resistance between the inner electrode 5, the bolt 3 and the sheet metal 1 respectively. As a rule, one will find that the last mentioned resistance contributions do not amount to more than 10% of the resistances to be overcome in the entire welding operation. Consequently, in the above described example, the total energy input would have to be chosen so as to amount to $10 \cdot 1.26 = 12.6$ watt seconds. Now this amount of energy must be applied to the weldable members through so brief a period of time that during the time of the flow of electric current no heat can yet flow from the welding point into the weldable member so that material is softened or liquefied only in the very small area calculated above. Experiments have shown that for instance for a thickness of 1 mm. of the sheet material the welding time must be less than 10 msec., however in the case of a sheet thickness of only .3 mm. it must be less than about 1 msec. One can see that the permissible duration of the welding current decreases more than the thickness of the sheet metal. This is entirely plausible because with decreasing sheet metal thickness the required amount of welding energy decreases, corresponding to the volume of the hemispheric volume mentioned above, with the third power, while the conduction of heat correspondingly plays an increasingly more important part, even during the very short duration of the impulse. Considering an assumed duration of the welding pulse of 1 msec. the calculated amount of 12.6 watt seconds welding energy corresponds to a maximum power input of 12.6 kilowatt which is a quite substantial amount.

The required electrical energy impulse can be produced in various ways. Usually for instance a transformed condenser discharge is used in generally known manner, but also direct condenser discharges may be used. Other possibilities consist in discharging an inductive storage device or by otherwise deriving by well known electrical means a suitable pulse from a low frequency alternating current.

The method according to the invention as just described is perfectly suitable also for handling sheet metal of substantially greater thickness and of metal having very good thermal conductivity as e.g. aluminum. This is particularly true if changes in the appearance of the second metal surface due to changes of its crystal structure are to be avoided and if according to the invention the temperature derived from the welding heat and reaching the just mentioned other surface is to be kept below a permissible critical temperature. Of course, the size of the weldable member to be welded to such a particular type of sheet material must also be chosen in relation to the just mentioned critical temperature.

Since nowadays special type storage batteries for extremely brief discharge are known on account of their use in operating photo-flashlights, also such electrochemical energy storage devices may be used for producing the required impulse energy.

It is easy to see that by the application of the arrangement and method according to the invention the disadvantages of standard and conventional welding methods are overcome and that accordingly the invention offers the possibility of carrying out welding operations on very thin sheet metal members having one sensitive or delicate surface without causing any damage thereof.

It will be understood that each of the elements described above, or two or more together, may also find a useful application in other types of electrical impulse welding arrangements and methods differing from the types described above.

While the invention has been illustrated and described as embodied in an arrangement and a method for electrical impulse welding of thin sheet metal members having one heat sensitive surface, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method of resistance-welding a weldable element from one side to one face of a weldable body having at least two faces opposite to each other, comprising the steps of establishing physical contact between the weldable element and the body in a predetermined area of one face of the latter; establishing an electrical circuit through one electrode in contact with said weldable element, through said body and through a second electrode in contact with said one face of said body in an area considerably larger than said predetermined area; and injecting into said circuit electric energy in a sufficient amount to raise the temperature in said predetermined area within a predetermined period of time to welding temperature characteristic of the materials of said weldable element and body, the duration of said period of time and the wattage of said electric energy being limited to such degree that the heat carried by said body from the weld area by thermal convection characteristic of the material of said body is insufficient to raise the temperature at the opposite face of said body beyond a point causing damage to said opposite face, said amount of electric energy being predetermined on the basis of the equation $E = \Delta T \cdot \frac{2}{3} r^3 \cdot \pi \cdot \gamma \cdot c$ wherein T is the permissible temperature rise at the boundary between said weldable body and said weldable element, $\frac{2}{3} r^3$ is the volume of a hemisphere having a radius $r$ equal to the thickness of said weldable body in the welding area, $\gamma$ is the density of the material of said weldable body and $c$ is the specific heat constant of said material, whereby a welding element can be welded to one face of even a comparatively thin sheet metal body without damaging the structure and appearance of the opposite face thereof.

2. A method of resistance-welding a weldable element from one side to one face of a weldable body having at least two faces opposite to each other, comprising the steps of establishing physical contact between the weldable element and the body in a predetermined area of one face of the latter; establishing an electrical circuit through one electrode in contact with said weldable element, through said body and through a second electrode in contact with said one face of said body in an area considerably larger than said predetermined area; and injecting into said circuit electric energy derived from an impulse source in a sufficient amount to raise the temperature in said predetermined area within a predetermined period of time ranging between the order of .5 msec. and the order of 10 msec. to welding temperature characteristic of the materials of said weldable element and body, the duration of said period of time and the wattage of said electric energy being limited to such degree that the heat carried by said body from the weld area by thermal convection characteristic of the material of said body is insufficient to raise the temperature at the opposite face of said body beyond a point causing damage to said opposite face, said amount of electric energy being predetermined on the basis of the equation $E=\Delta T \cdot \frac{2}{3} r^3 \cdot \pi \cdot \gamma \cdot c$ wherein T is the permissible temperature rise at the boundary between said weldable body and said weldable element, $\frac{2}{3} r^3$ is the volume of a hemisphere having a radius r equal to the thickness of said weldable body in the welding area, $\gamma$ is the density of the material of said weldable body and c is the specific heat constant of said material, whereby a welding element can be welded to one face of even a comparatively thin sheet metal body without damaging the structure and appearance of the opposite face thereof.

3. A method of resistance-welding a weldable element from one side to one face of a weldable body having at least two faces opposite to each other, comprising the steps of establishing physical contact between the weldable element and the body in a predetermined area of one face of the latter; establishing an electrical circuit through one electrode in contact with said weldable element, through said body and through a second electrode in contact with said one face of said body in an area considerably larger than said predetermined area; and injecting into said circuit electric energy derived from the discharge of a condenser means in a sufficient amount to raise the temperature in said predetermined area within a predetermined period of time ranging between the order of .5 msec. and the order of 10 msec. to welding temperature characteristic of the materials of said weldable element and body, the duration of said period of time and the wattage of said electric energy being limited to such degree that the heat carried by said body from the weld area by thermal convection characteristic of the material of said body is insufficient to raise the temperature at the opposite face of said body beyond a point causing damage to said opposite face, said amount of electric energy being predetermined on the basis of the equation $E=\Delta T \cdot \frac{2}{3} r^3 \cdot \pi \cdot \gamma \cdot c$ wherein T is the permissible temperature rise at the boundary between said weldable body and said weldable element, $\frac{2}{3} r^3$ is the volume of a hemisphere having a radius r equal to the thickness of said weldable body in the welding area, $\gamma$ is the density of the material of said weldable body and c is the specific heat constant of said material, whereby a welding element can be welded to one face of even a comparatively thin sheet metal body without damaging the structure and appearance of the opposite face thereof.

4. A method of resistance-welding a weldable steel element from one side to one face of a weldable steel body having at least two faces opposite to each other and a thickness of the order of 1 mm. therebetween, comprising the steps of establishing physical contact between the weldable element and the body in a predetermined area of the order of 1 mm.$^2$ of one face of the latter; establishing an electrical circuit through one electrode in contact with said weldable element, through said body and through a second electrode in contact with said one face of said body in an area considerably larger than said predetermined area; and injecting into said circuit electric energy of the order of 12.6 w. sec. to raise the temperature in said predetermined area within a predetermined period of time of the order of less than 10 msec. to welding temperature characteristic of said weldable element and body, the duration of said period of time and the wattage of said electric energy being limited to such degree that the heat carried by said body from the weld area by thermal convection characteristic of the material of said body is insufficient to raise the temperature at the opposite face of said body beyond 100° C. being a point causing damage to said opposite face, said amount of electric energy being predetermined on the basis of the equation $E=\Delta T \cdot \frac{2}{3} r^3 \cdot \pi \cdot \gamma \cdot c$ wherein T is the permissible temperature rise at the boundary between said weldable body and said weldable element, $\frac{2}{3} r^3$ is the volume of a hemisphere having a radius r equal to the thickness of said weldable body in the welding area, $\gamma$ is the density of the material of said weldable body and c is the specific heat constant of said material, whereby a welding element can be welded to one face of said comparatively thin sheet metal body without damaging the structure and appearance of the opposite face thereof.

5. A method of resistance-welding a weldable steel element from one side to one face of a weldable steel body having at least two faces opposite to each other and a thickness of the order of .3 mm. therebetween, comprising the steps of establishing physical contact between the weldable element and the body in a predetermined area of the order of 1 mm.$^2$ of one face of the latter; establishing an electrical circuit through one electrode in contact with said weldable element, through said body and through a second electrode in contact with said one face of said body in an area considerably larger than said predetermined area; and injecting into said circuit electric energy of the order of .36 w. sec. to raise the temperature in said predetermined area within a predetermined period of time of the order of less than 1 msec. to a welding temperature characteristic of said weldable element and body, the duration of said period of time and the wattage of said electric energy being limited to such degree that the heat carried by said body from the weld area by thermal convection characteristic of the material of said body is insufficient to raise the temperature at the opposite face of said body beyond 100° C. being a point causing damage to said opposite face, said amount of electric energy being predetermined on the basis of the equation $E=\Delta T \cdot \frac{2}{3} r^3 \cdot \pi \cdot \gamma \cdot c$ wherein T is the permissible temperature rise at the boundary between said weldable body and said weldable element, $\frac{2}{3} r^3$ is the volume of a hemisphere having a radius r equal to the thickness of said weldable body in the welding area, $\gamma$ is the density of the material of said weldable body and c is the specific heat constant of said material, whereby a welding element can be welded to one face of said comparatively thin sheet metal body without damaging the structure and appearance of the opposite face thereof.

6. A method of resistance-welding a weldable steel element from one side to one face of a weldable steel body having at least two faces opposite to each other and a thickness of the order of 1 mm. therebetween, comprising the steps of establishing physical contact between the weldable element and the body in a predetermined area of the order of 1 mm.$^2$ of one face of the latter; establishing an electrical circuit through one electrode in contact with said weldable element, through said body and through a second electrode in contact with said one face of said body in an area considerably larger than said predetermined area; and injecting into said circuit electric energy of the order of 12.6 w. sec. derived from the discharge of energy storage means to raise the temperature in said predetermined area within a predetermined period of time of the order of less than 10 msec. to welding temperature characteristic of said weldable element and body, the duration of said period of time and the wattage of said electric energy being limited to such degree that the heat carried by said body from the weld area by thermal convection characteristic of the material of said body is insufficient to raise the temperature at the opposite face of said body beyond 100° C. being a point causing damage to said opposite face, said amount of electric energy being predetermined on the basis of the equation $E=\Delta T \cdot \frac{2}{3} r^3 \cdot \pi \cdot \gamma \cdot c$ wherein T is the permissible temperature rise at the boundary between said weldable body and said weldable element, $\frac{2}{3} r^3$ is the volume of a hemisphere having a radius r equal to the thickness of said weldable body in the welding area, $\gamma$ is the density of the material of said weldable body and $c$ is the specific heat constant of said material, whereby a welding element can be welded to one face of said comparatively thin sheet metal body without damaging the structure and appearance of the opposite face thereof.

7. A method of resistance-welding a weldable steel element from one side to one face of a weldable steel body having at least two faces opposite to each other and a thickness of the order of 1 mm. therebetween, comprising the steps of establishing physical contact between the weldable element and the body in a predetermined area of the order of 1 mm.² of one face of the latter; establishing an electrical circuit through one electrode in contact with said weldable element, through said body and through a second electrode in contact with said one face of said body in an area considerably larger than said predetermined area; and injecting into said circuit electric energy of the order of 12.6 w. sec. derived from the discharge of a condenser means to raise the temperature in said predetermined area within a predetermined period of time of the order of less than 10 m.sec. to welding temperature characteristic of said weldable element and body, the duration of said period of time and the wattage of said electric energy being limited to such degree that the heat carried by said body from the weld area by thermal convection characteristic of the material of said body is insufficient to raise the temperature at the opposite face of said body beyond 100° C. being a point causing damage to said opposite face, said amount of electric energy being predetermined on the basis of the equation $E=\Delta T \cdot 2/3 r^3 \cdot \pi \cdot \gamma \cdot c$ wherein T is the permissible temperature rise at the boundary between said weldable body and said weldable element, $\frac{2}{3}r^3$ is the volume of a hemisphere having a radius $r$ equal to the thickness of said weldable body in the welding area, $\gamma$ is the density of the material of said weldable body and $c$ is the specific heat constant of said material, whereby a welding element can be welded to one face of said comparatively thin sheet metal body without damaging the structure and appearance of the opposite face thereof.

8. In a resistance welding machine for welding a weldable element from one side to one face of a weldable body in a predetermined area of contact between one face of said element and said one face of said body, in combination, an electric impulse source for producing a welding current impulse of extremely brief duration and of precisely limited energy content and including storage condenser means furnishing a predetermined impulse of sumbstantially constant discharge voltage and an impulse transformer connected to be supplied with said discharge voltage and having output terminals for delivering a transformed voltage impulse containing a sufficient amount of electric energy to raise the temperature in said predetermined area, when said element and said body are in contact with each other in said area, within a predetermined period of time to welding temperature characteristic of the materials of said weldable element and body, the duration of said period of time and the wattage of said electric energy being limited to such degree that the heat carried by said body from the weld area by thermal convection characteristic of the material of said body is insufficient to raise the temperature at the opposite face of said body beyond a point causing damage to said opposite face, said amount of electric energy being predetermined on the basis of the equation $E=\Delta T \cdot \frac{2}{3} r^3 \cdot \pi \cdot \gamma \cdot c$ wherein T is the permissible temperature rise at the boundary between said weldable body and said weldable element, $\frac{2}{3}r^3$ is the volume of a hemisphere having a radius $r$ equal to the thickness of said weldable body in the welding area, $\gamma$ is the density of the material of said weldable body and $c$ is the specific heat constant of said material, a first and a second electrode means adapted to be placed in conductive contact with said weldable element and with said weldable body, respectively; conductor means connecting said first and second electrode means with said output terminals of said transformer, respectively, said conductor means and said electrode means being dimensioned and arranged in such a manner that the total inductance thereof is kept below .1 $\mu$h.; pressure means for applying pressure to said first and second electrode means independently of each other for establishing pressure contact between said first and second electrode means, said weldable element and said weldable body, respectively; and first and second elastic pressure transmitting members interposed independently of each other between said pressure means and said first and second electrode means, respectively, whereby a weldable element can be welded to one face of even a comparatively thin metal body without damaging the structure and appearance of the opposite face thereof.

References Cited in the file of this patent
UNITED STATES PATENTS

| | | |
|---|---|---|
| 1,489,093 | Mershon et al. | Apr. 1, 1924 |
| 2,087,530 | Potchen | July 20, 1937 |
| 2,287,540 | Vang | June 23, 1942 |